(12) United States Patent
Bonn et al.

(10) Patent No.: US 12,464,014 B1
(45) Date of Patent: Nov. 4, 2025

(54) MITIGATING DENIAL OF SERVICE ATTACKS ON TELECOMMUNICATION SERVICES

(71) Applicant: T-MOBILE INNOVATIONS LLC, Overland Park, KS (US)

(72) Inventors: Mark Bonn, Granite Bay, CA (US); Dominick Mangiardi, Fremont, CA (US); Kenneth George, Houston, TX (US); John Susbilla, Milpitas, CA (US); Abdolreza Asghari, Santa Clara, CA (US)

(73) Assignee: T-Mobile Innovations LLC, Overland Park, KS (US)

( * ) Notice: Subject to any disclaimer, the term of this patent is extended or adjusted under 35 U.S.C. 154(b) by 1066 days.

(21) Appl. No.: 16/861,013

(22) Filed: Apr. 28, 2020

(51) Int. Cl.
| | |
|---|---|
| *H04L 45/00* | (2022.01) |
| *H04L 9/40* | (2022.01) |
| *H04L 41/0654* | (2022.01) |
| *H04L 43/08* | (2022.01) |
| *H04L 43/16* | (2022.01) |
| *H04L 65/1016* | (2022.01) |
| *H04L 65/1104* | (2022.01) |
| *H04L 67/01* | (2022.01) |
| *H04L 69/18* | (2022.01) |
| *H04W 4/02* | (2018.01) |
| *H04W 4/021* | (2018.01) |
| *H04W 4/90* | (2018.01) |
| *H04W 12/122* | (2021.01) |
| *H04W 28/02* | (2009.01) |
| *H04W 40/02* | (2009.01) |

(Continued)

(52) U.S. Cl.
CPC ...... *H04L 63/1458* (2013.01); *H04L 65/1016* (2013.01); *H04L 65/1104* (2022.05); *H04W 4/021* (2013.01); *H04W 4/90* (2018.02); *H04W 12/122* (2021.01); *H04W 48/06* (2013.01); *H04W 64/00* (2013.01); *H04L 2463/142* (2013.01)

(58) Field of Classification Search
CPC . H04L 65/1006; H04L 65/1016; H04L 65/80; H04L 67/322; H04W 84/12; H04W 36/0022; H04W 4/029; H04M 3/5116; H04M 15/57
USPC .............................. 370/259; 455/422.1, 404.1
See application file for complete search history.

(56) References Cited

U.S. PATENT DOCUMENTS

| | | | |
|---|---|---|---|
| 8,254,910 B1 * | 8/2012 | Breau ................... | H04W 28/18 455/423 |
| 2012/0047558 A1 * | 2/2012 | Sundaram .............. | H04L 63/10 726/3 |

(Continued)

*Primary Examiner* — Marcus Smith
*Assistant Examiner* — Jason A Harley
(74) *Attorney, Agent, or Firm* — SHOOK, HARDY & BACON L.L.P.

(57) ABSTRACT

Systems and methods are provided for mitigating undesirable service disruptions in a communications network. Based on a determination that an access failure rate exceeds a threshold, it may be determined that a particular service is degraded or that a requesting user device is not authorized to access the service. One or more mitigation protocols may be used to block subsequent attempts by the requesting user device, a set of user devices associated with the requesting user device, or an area associated with the requesting user device to request access to the service.

20 Claims, 4 Drawing Sheets

(51) Int. Cl.
*H04W 48/06* (2009.01)
*H04W 64/00* (2009.01)

(56) References Cited

U.S. PATENT DOCUMENTS

| | | | | |
|---|---|---|---|---|
| 2013/0208629 | A1* | 8/2013 | Luo | H04L 65/80 |
| | | | | 370/259 |
| 2017/0170973 | A1* | 6/2017 | Gill | H04L 63/0823 |
| 2017/0208462 | A1* | 7/2017 | Zaifuddin | H04W 12/08 |
| 2018/0375991 | A1* | 12/2018 | Bot | H04W 76/12 |
| 2019/0037339 | A1* | 1/2019 | Liu | H04L 61/5007 |
| 2019/0306189 | A1* | 10/2019 | Torgerson | H04L 9/3213 |

* cited by examiner

MITIGATING DENIAL OF SERVICE ATTACKS ON TELECOMMUNICATION SERVICES

The present disclosure is directed, in part, to mitigating denial of service attacks on telecommunication services, substantially as shown in and/or described in connection with at least one of the figures, and as set forth more completely in the claims.

In aspects set forth herein, one or more hacking mitigation protocols takes place in response to determinations or observations of an ongoing denial of service attack on a telecommunication service or network. Generally, telecommunication networks, including wireless telecommunication networks allow users to access various services (e.g., voice service, data service, priority service). Telecommunication networks typically include several chokepoints, where congestion, whether routine, unintentionally disruptive, or hostile can degrade or prevent users from accessing a particular service. One example of such services are priority telecommunication services such as enhanced 911 (e911), the Government Emergency Telecommunication Service (GETS), the Nationwide Wireless Priority Service (WPS), and other National Security/Emergency Preparedness Priority Services (NS/EPs). Unfortunately, network components that provide access or routing for user devices to such services can become congested in times of high traffic, to the point where the desired service is degraded or unavailable.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
CD-ROM Compact Disk Read Only Memory
CDMA Code Division Multiple Access
eNodeB Evolved Node B
GIS Geographic/Geographical/Geospatial Information System
gNodeB Next Generation Node B
GETS Government Emergency Telecommunication Service
GPRS General Packet Radio Service
GSM Global System for Mobile communications
DVD Digital Versatile Discs
EEPROM Electrically Erasable Programmable Read Only Memory
LED Light Emitting Diode
LTE Long Term Evolution
MIMO Multiple Input Multiple Output
PC Personal Computer
PCS Personal Communications Service
PDA Personal Digital Assistant
PIN Personal Identification Number
RAM Random Access Memory
RF Radio-Frequency
RFI Radio-Frequency Interference
R/N Relay Node
RNR Reverse Noise Rise
ROM Read Only Memory
RSRP Reference Transmission Receive Power
RSRQ Reference Transmission Receive Quality
RSSI Received Transmission Strength Indicator
SINR Transmission-to-Interference-Plus-Noise Ratio
SIP Session Initiation Protocol
SNR Transmission-to-noise ratio
SON Self-Organizing Networks
TDMA Time Division Multiple Access
TXRU Transceiver (or Transceiver Unit)
UE User Equipment
UMTS Universal Mobile Telecommunications Systems
WCD Wireless Communication Device (interchangeable with UE)
WPS Wireless Priority Service Further, various technical terms are used throughout this description. An illustrative resource that fleshes out various aspects of these terms can be found in Newton's Telecom Dictionary, 31st Edition (2018).

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, wireless telecommunication networks provide access for a user device (e.g., a UE) to access one or more network services. In some cases, the desired network service may be a telecommunication service, such as those that provide a priority voice connection to the user device. Priority voice services allow an authorized user device to be prioritized in a connection queue, which allows the authorized user device to have a higher-priority to limited telecommunication services. In some aspects, the desired telecommunication service may be an emergency communication service (e.g., GETS, WPS, e911, and the like); such services are particularly valuable during periods of severe network congestion or disruption, when new, high priority emergency, connections are permitted to connect before non-emergent connections. In order to preserve the value of the emergency service, many services are access restricted. For example, access to WPS is restricted to a limited number of wireless devices; when a user device attempts to dial into the WPS, one or more components of the network will determine, by comparing a unique device identifier to a directory of authorized user devices, whether the user device is authorized. If the user device is authorized, the resultant connection request is prioritized over non-emergency traffic in the connection queue.

Unfortunately, like many modern networks, access-restricted telecommunication services are often targeted, whether inadvertently or deliberately, by actions that could compromise their intended purpose. For example, a user could misdial a number or dial a service access number without understanding the requirements for access, or a hostile actor could launch a coordinated and deliberate attack on the service in order to deny or degrade valid service usage. Regardless of intent, unauthorized attempts to connect to the restricted service have the effect of busying the service and preventing the service from serving valid traffic. Generally, anomalous behavior may be identified by comparing the rate of service access requests with service access successes (e.g., a request to access a service or content from an Application Service (AS) vs. th AS granting access to the service or providing the requested content). Specific to restricted access services, anomalous behavior may be identified by comparing the rate of service access requests/attempts vs. successes, as discussed in greater detail herein.

Accordingly, a first aspect of the present disclosure is directed to a system for mitigating impacts on services in a communications network. The system comprises one or more nodes, each of the one or more nodes configured to wirelessly communicate with one or more user devices in a geographic service area; and one or more processors configured to perform operations. The operations comprise receiving a plurality of access requests from the one or more user devices to access a service on the communications network. The operations further comprise determining that at least a portion of the plurality of access requests fail to connect to an application service associated with the service. The operations further comprise implementing, based on a rate of access request failures exceeding a predetermined threshold, one or more protocols, the one or more protocols comprising blocking one or more subsequent access requests from the one or more user devices to access the service.

A second aspect of the present disclosure is directed to A method for mitigating hacking of a priority telecommunication service. The method comprises receiving a plurality of SIP invites from a user device to access a priority telecommunication service, each of the plurality of SIP invites comprising a p access network information header (PANI header), the PANI header comprising a cell global identifier associated with the cell that is connected to the user device. The method further comprises determining an access failure rate of the user device exceeded a threshold during a sampling period. The method further comprises blocking subsequent SIP invites from one or more user devices based on a determination that each subsequent SIP invite of the subsequent SIP invites comprises the cell global identifier associated with the cell that is connected to the user device.

According to another aspect of the technology described herein, a non-transitory computer readable media, having instructions stored thereon, that, when executed by one or more processors, cause the one or more processors to carry out a method a method for mitigating a denial of service attack on a restricted telecommunication service. The method comprises determining that one or more user devices has an access failure rate greater than a predetermined threshold, wherein the access failure rate comprises a ratio of priority connection requests to priority connection successes, and wherein the priority connection requests comprises a SIP invite. The method further comprises determining at least one of a unique identifier and an origination location for each user device of the one or more user devices. The method further comprises blocking subsequent attempts by the one or more user devices to access the restricted telecommunication service for a predetermined time period Referring to FIG. 1, a diagram is depicted of an exemplary computing environment suitable for use in implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

Figure 1:
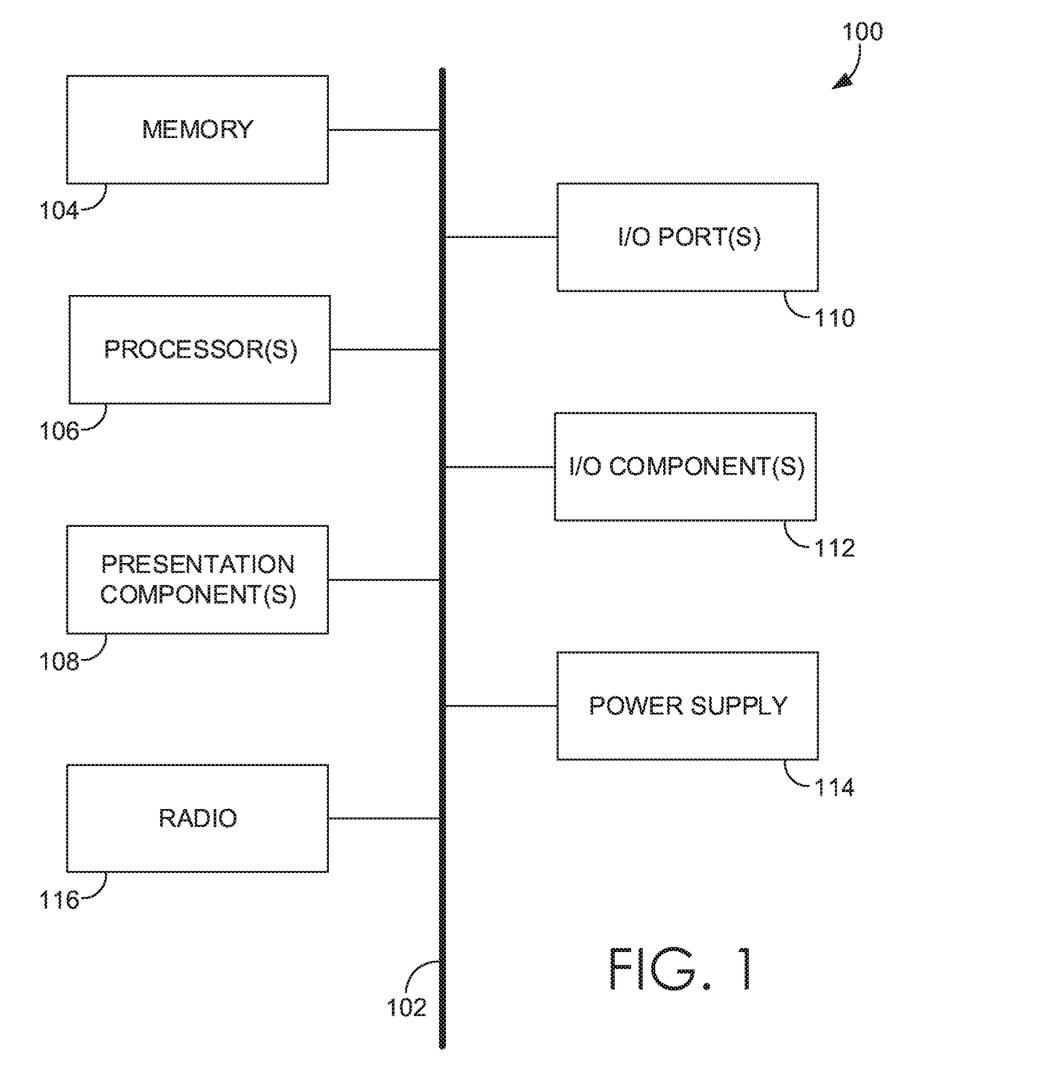
FIG. 1 is a diagram of a computing environment suitable for use in implementations of the present disclosure.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O) components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, and the like. Radio 116 might additionally or alternatively facilitate other types of wireless communications including Wi-Fi, WiMAX, LTE, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Figure 2:
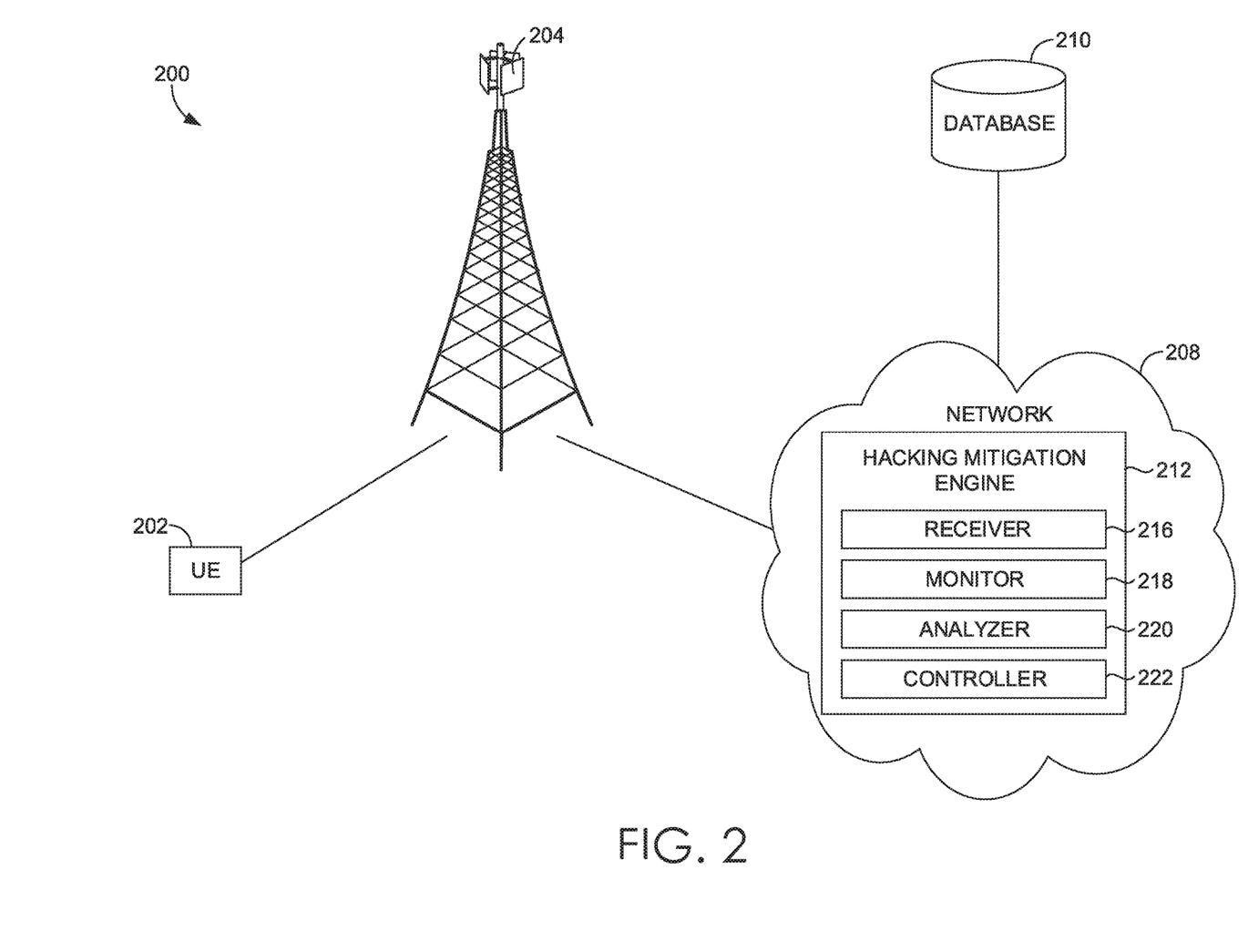
FIG. 2 illustrates a network environment in which implementations of the present disclosure may be employed.

FIG. 2 provides an exemplary network environment in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes user device 202, a node 204, network 208, database 210, and hacking mitigation engine 212. In network environment 200, the user device 202 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 100) that wirelessly communicates with a node of the wireless network, such as the node 204, in order to interact with one or more components of the network 208. The user device 202 may be said to have a unique identifier, used to exclusively identify the user device (e.g., an Automatic Number Identifier (ANI) when it attempts to or actually connects to the one or more components of the network 208.

In some aspects, the user device 202 can correspond to a computing device 100 in FIG. 1. Thus, a user device can include, for example, a display(s), a power source(s) (e.g., a battery), a data store(s), a speaker(s), memory, a buffer(s), a radio(s) and the like. In some implementations, the user device 202 comprises a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network. Further, the user device 202 may communicate with the node 204 on any one or more frequencies, frequency bands, channels, or the like. Though only the node 204 is depicted in FIG. 2, it should be understood that the user device 202 may be capable of connecting to any one or more of a plurality of nodes, using any one or more of a plurality of communication protocols, on any one or more of a plurality of frequencies.

In some cases, the user device 202 in network environment 200 can optionally utilize network 208 to communicate with other computing devices (e.g., a mobile device(s), a server(s), a personal computer(s), etc.) through the node 204. The network 208 may be a telecommunications network(s), or a portion thereof. A telecommunications network might include an array of devices or components (e.g., one or more base stations, servers, computer processing components), some of which are not shown. Those devices or components may form network environments similar to what is shown in FIG. 2, and may also perform methods in accordance with the present disclosure. Components such as terminals, links, and nodes (as well as other components) can provide connectivity in various implementations. Network 208 can include multiple networks, as well as being a network of networks, but is shown in more simple form so as to not obscure other aspects of the present disclosure. For example, the network 208 may comprise a core network, which may further be said to comprise one or more components of a transport layer, control layer, and/or application layer. The network 208 may alternatively comprise an Internet Protocol Multimedia Service (IMS) core. The network 208 may comprise any one or more components, subcomponents, processors, engines, or the like, which perform functions for establishing a connection between the user device 202 and a destination. In aspects, the network 208 may comprise a Media Resource Function (MRF), which may be configured to receive a request or other indication from the user device 202 that the user device 202 is attempting to access a particular service and, in response to such a request, reply to the user device 202 with a prompt for additional information. The network 208 may comprise a call session control function (CSCF), such as a Proxy-CSCF (P-CSCF), which, when configured at or near the edge of the IMS core or network 208, handle Session Initial Protocol SIP signaling packets (e.g., SIP INVITE). Further, the network 208 may be said to comprise one or more application servers, which provide access to an application or service requested by the user device 202.

In aspects, the network 208 may comprise one or more components of a radio access network (RAN). In said aspects, the RAN can be part of a telecommunication network that connects subscribers to their immediate service provider or one or more core networks. For example, the RAN can be associated with a telecommunications provider that provides services (e.g., voice, data, SMS) to user devices, such as user device 202. For example, network 208 may provide voice, SMS, and/or data services to user devices or corresponding users that are registered or subscribed to utilize the services provided by a telecommunications provider. Accordingly, the network 208 may comprise any one or more communication networks providing voice, SMS, and/or data service(s), such as, for example, a 1× circuit voice, a 3G network (e.g., CDMA, CDMA2000, WCDMA, GSM, UMTS), a 4G network (WiMAX, LTE, HSDPA), a 5G network, or a PSTN.

In some implementations, the node 204 is configured to communicate with user devices, such as the user device 202 that are located within the geographical area, or cell, covered by the one or more antennas of the node 204. Said area may be referred to herein as a geographic coverage area, sector, or the like. Though referred to as a node for simplicity, the node 204 may include (or be communicatively coupled to) one or more base stations, nodes, base transmitter stations, radios, antennas, antenna arrays, power amplifiers, transmitters/receivers, digital signal processors, control electronics, GPS equipment, and the like. In particular, the node 204 may receive a variety of uplink signals from the user device 202 that include requests to access a particular application, service, object, or the like (e.g., an access-restricted telecommunication service). These requests may comprise one or more messages using a standardized protocol, such as the Session Initiation Protocol (SIP). SIP is a protocol that is used to establish, maintain, or terminate a session, such as a voice, data, video, or messaging function. As used herein, the term "SIP Invite" is used as a general term, comprising actual SIP Invite messaging according to SIP standards, that refers to a request from the user device 202 to one or more components of the network 208 to access a particular service, object, or the like. Further, As the backbone of the RAN, the node 204 facilitates the establishment and maintenance of a connection between the user device 202 and the network 208. In other aspects, such as when the use device 202 is not a wireless telephone (e.g., if the user device 202 is a computer or non-cellular enabled tablet), the node 204 may take the form of a router, modem, or other access point that provides a link between the user device 202 and the network 208.

The network 208 may comprise or be communicatively coupled to one or more components that, together, may be said to comprise a hacking mitigation engine 212 that is utilized, in various implementations, to perform one or methods for mitigating hacking of or disruptions to a restricted access telecommunications service. The hacking mitigation engine 212 may be said to comprise any one or more of an receiver 216, a monitor 218, an analyzer 220, and a controller 222. However, in other implementations, more or less components than those shown in FIG. 2 may be utilized to carry out aspects of the invention described herein. Though shown as within the network 208, the hacking mitigation engine 212 or any of its components or subcomponents may take the form of one or more software stacks, modules, applications, etc., may be executed and/or located at a single location or a plurality of locations, and may executed by one or more network components, or may provide instructions for execution at a location remote to the beam sweeping management engine. As a whole, the hacking mitigation engine 212 operates to receive requests or attempts from the user device 202 to access a service, determines if the user device is authorized to access the service, monitors for an access failure or completion rate, and utilizes the access failure rates of one or more devices to determine if a particular hacking mitigation protocol should be implemented to prevent the service from being congested or disrupted by illegitimate traffic.

The receiver 216 of the hacking mitigation engine 212 is generally responsible for receiving information and/or indications from various network components and/or user devices that may be relevant for making hacking mitigation decisions. The receiver 216 may receive an indication that the user device 202 has requested access to, or attempted to access, a service (e.g., the user device 202 dialed an access number associated with the restricted service, the user device 202 dialed a prefix, suffix, or used a local application associated with a request for access to the restricted service, or the like). The receiver 216 may receive an indication, separately or as part of the same message comprising the access request, of a unique identifier associated with the user device (e.g., an automatic number identification (ANI)). In aspects where the use device 202 utilizes a wireless connection to access the network 208, the ANI may be obtained from one or more SIP messages or packets.

The receiver 216 may receive one or more indications of a position of a user device, such as the user device 202. The one or more indications of the position of the user device may comprise at least one of a geographic coordinate (i.e., geo-coordinate) and a time that the user device 202 was located at the geographic coordinate. The geographic coordinate may be based on any desirable methodology; for example, the geographic coordinate may be based on or provided by an extra-terrestrial or terrestrial navigation system (e.g., GPS, GLONASS, LORAN, and the like), or it may be based on one or more determinations made by any one or more components of the user device 202, node 204, or network 208, based on information available to them (e.g., network-based location services, triangulation, lines of bearing to a node, time delay location, and the like). The receiver 216 may receive user device position information directly from the user device, or indirectly, via one or more network components 208. The receiver 216 may determine, based on one or more packets or messages communicated from the user device 202 to the network 208 via the node 204, a geographic location of the node 204 that is connected to the user device 202 by comparing a node identifier to a known location of the node 204 (e.g., from a base station almanac). For example, the receiver 216 may determine, by processing a received SIP Invite comprising a P-Access Network Information (PANI) header, the radio access type/technology (RAT) and a cell identifier (e.g., a Cell Global Identification (CGI)) of the cell that has connected the user device 202 to the network 208, and determine the location of the cell based on a match of the CGI to an entry in the base station almanac. The receiver 216 may communicate the access request, unique device identifier, and/or position information of the user device 202, position of the cell, and any/all other user devices within a desirable geographic area to one or more of the monitor 218, the analyzer 220, or the controller 222.

The monitor 218 of the hacking mitigation engine 212 is generally responsible for compiling the one or more indications received by the receiver 216. The monitor 216 may append the one or more received indications with a time entry, in order to compile a series of interactions between the user device 202 and the network 208 over a predetermined period of time that are relevant to the service. For example, the monitor 216 may compile and log a series of interactions (e.g., 3, 5, 10, 100, etc.) associated with the user device 202 attempting to access the same restricted service within the predetermined time (e.g., 1, 5, 10, 15, or 60 minutes, or the like). Further the monitor 218 may be configured to track and compile a log comprising a plurality of access requests by a plurality of user devices, wherein each of the plurality of user devices is located within a predetermined radius. For example, the monitor 218 may create a log a number of access requests (5, 10, 50, 100, 1000, etc.) by a number of devices (e.g., 2, 5, 10, 100, etc.) within a radius of one another (e.g., 0.1, 1, 5, 10, or 25 miles, etc.). The monitor 218 may also be configured to determine whether or not an access request, manifested, for example, by a SIP Invite, was eventually granted. That is, the monitor 218 may make determinations about whether or not the access request matriculated into an access grant. Though primarily discussed with respect to indications and determinations relevant to a single user device, such as user device 202, it is specifically envisioned that the monitor 218 may simultaneously monitor the indications and information discussed herein for a plurality of user devices, such as every device of a particular IMS core. The monitor 218 is configured to provide all or a portion of the monitored indications or compilations of indications to the analyzer 220, the controller 222, or any other component, subcomponent, processor, or software stack of the network 208.

The analyzer 220 is generally responsible for determining whether a hacking event is occurring, determining a hacking mitigation protocol, and communicating the hacking mitigation protocol to the controller 222. The analyzer 220 may determine a service disruption is occurring that should trigger a hacking mitigation protocol using any one or more determinations. The analyzer 220 may monitor utilization of a particular service, the overall access failure rate of the service, or monitor the individual or group access failure rate for one or more user devices The analyzer 220 may base hacking mitigation protocol decisions, at least in part, on a determination that a service degradation is occurring. That is, the analyzer 220 may query or receive an indication from one or more components of the network 208, such as an AS, that a particular service has become degraded or congested. Such a determination may be made by comparing a current access load (number of connections or access grants) exceeding a predetermined threshold capacity of the component (e.g., 50%, 75%, 95%, 100% etc.) or by an average access load over a predetermined period of time (e.g., 5, 10, 15, 30 minutes or more). The degradation/congestion determination may be based on an indication that the user device 202 has requested access to the service, an indication that the user device is authorized to access the service, and that the user device 202 was not granted access to the service.

The analyzer 220 may base hacking mitigation protocol decisions, at least in part, on a particular user device persistently attempting to access a service without having access granted. The analyzer 220 may receive one or more communications from the monitor 218 that a particular user device has made attempts to access the service but was not granted access. The analyzer 220 may compile the communications to determine the extent of the failed access by determining how many access failures have occurred within a predetermined period of time or an access failure frequency. The analyzer 220 may compare the number of access failures or the access failure frequency to a predetermined threshold (e.g., greater than one attempt, on average, per minute over a five minute time period, 2 attempts per minute, 5 attempts per minute, etc.). In aspects where the analyzer 220 bases hacking mitigation protocol decisions on a particular user device, the analyzer 220 may trigger a hacking mitigation protocol against the particular user device, user devices within a range of the particular user device, user devices served by the same cell as the particular user device, or the like.

The analyzer 220 may base hacking mitigation protocol decisions, at least in part, on a dynamic context system. The dynamic context system may take into account the location of an emergency, in the case of an emergency service (e.g., WPS, e911, GETS, etc.), the number, location, or behavioral similarities of a set of user devices, the originating cell(s), or the destination service/object/number. In aspects where the service is a priority emergency service, the dynamic context system may factor the location of the emergency that triggered service usage. For example, if an emergency is occurring in a first location, the dynamic context system may be have lower thresholds for service usage in locations that are not within a predetermined distance of the emergency (e.g., 5, 10, 50, 100 miles). The dynamic context system may factor the number, location, or behavioral similarities of a set of user devices. For example, if a WPS AS experienced an unusual SIP Invite volume (e.g., greater than 150%, 200%, etc., of average volume) and a set of user devices associated with the unusual volume are within a predetermined radius (e.g., 1, 5, 10, 25 miles) or the set of user devices are associated with one or more cells within the predetermined radius, the analyzer may determine that a DOS attack is occurring and implement a mitigation protocol. In another aspect, the dynamic context system may consider behavioral similarities of the set of user devices. For example, the analyzer 220 may determine that a greater than threshold number user devices (e.g., 5, 10, 25, 50, 100, 500) communicate a similar request (e.g., SIP Invite) to a similar location (e.g, WPS AS) within a common IMS core, and after a common amount of time terminate the connection (i.e., before the WPS AS has authenticated the user devices of the set of user devices).

In response to a determination by the analyzer 220 that a hacking mitigation protocol should be implemented, the analyzer 220 may determine the details of the protocol to be implemented. Suitable hacking mitigation protocols may be referred to as an "exclude out," "exclude in," "exclude device," or "exclude set." Generally, the hacking mitigation protocols may be communicated to and executed by the controller 222 (e.g., by setting a Time To Live (TTL) or permanent block at the network edge (e.g., a P-CSCF) to prevent a request (e.g., a SIP Invite) from ever reaching the relevant service component (e.g., an AS). An exclude out protocol may be used to block all user devices from accessing an AS if the device or serving cell location is not within a prescribed area (e.g., a radius of a point such as an emergency, cell, etc., or other type of defined geofenced area). An exclude in protocol may be used to block all user devices from accessing the AS if the device is within the prescribed area. An exclude device protocol may be used to block a particular user device from making any requests (or may be limited to requests associated with one or more services) during a time (TTL block) or indefinitely (permanent block). In an aspect, the exclude device protocol may be used when the analyzer 220 determines that a SIP Invite or service request has been spoofed or when a threshold number of spoofed service requests have been received by the particular user device within a predetermined sampling period. An exclude set protocol may be used similar to an exclude device protocol but encompasses a set of user devices comprising two or more user devices. One skilled in the art may appreciate that numerous various combinations of triggers and protocols described or similar to those described herein may be desirable in various contexts. The analyzer 220 may communicate the hacking mitigation protocol to the controller 222, wherein the controller implements the protocol by providing one or more blocking or filtering instructions to one or more components of the network 208 (e.g., a P-CSCF, serving cell, MRF, AS, or other suitable component(s)).

Figure 3:
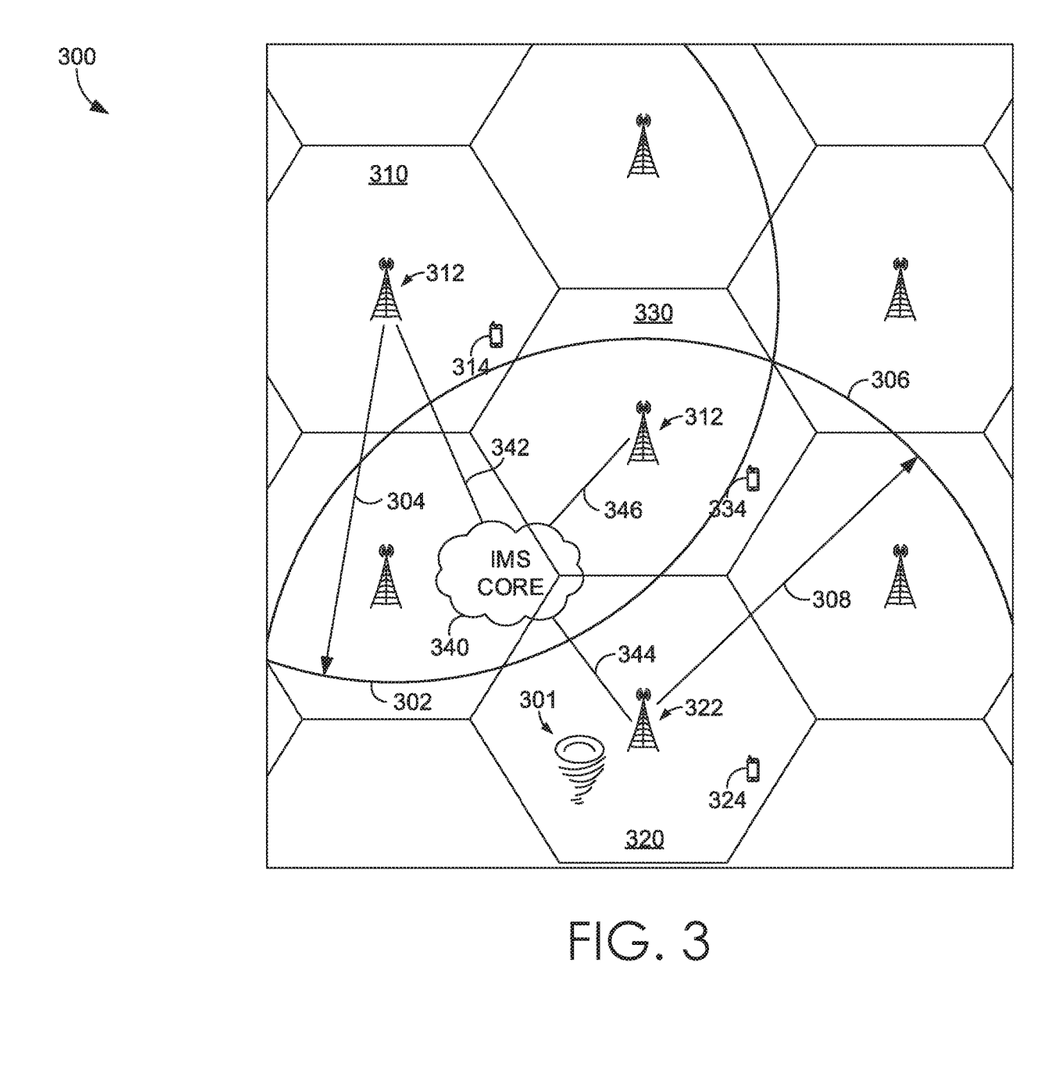
FIG. 3 illustrates an exemplary environment in which implementations of the present disclosure may be employed.

Turning now to FIG. 3, environment 300 illustrates select examples of how the components and functions described herein work cooperatively to reduce the undesirable impact of congestion on a particular service. The environment 300 is illustrated as comprising numerous hexagonal cells (e.g., 310, 320, and 330), each cell served by a single node (e.g., 312, 322, 332), numerous user devices (e.g., 314, 324, 334), and an IMS core 340 connected to multiple nodes (shown as connections 342, 344, 346).

A first example illustrates how the present disclosure may be effective in mitigating service or network congestion even if no user device has hostile intent. If one or more user devices, represented by a first user device 314 attempt to access a service (e.g., a multimedia service) on the IMS core 340, the hacking mitigation engine 212 of FIG. 2 may be running on the IMS core 340 and detect that the user device 314 has an access failure rate greater than a threshold (e.g., greater than 75% of SIP Invites fail to yield access to the service, and greater than one SIP Invite has been received per second, on average, by the relevant AS over a one minute period). Agnostic to whether or not the user device 314 is hostile or is experiencing some type of service or processing failure that causes connection failures, the analyzer 220 of FIG. 2 may trigger a device exclude type protocol comprising a TTL block, wherein the user device 314 is blocked by the P-CSCF from accessing the relevant AS for a period of time (e.g., 5 minutes). This exemplary scenario would effectively reduce the demand on the relevant AS, improving performance for other user devices or providing service availability that may have otherwise been tied up by the user device 314's ineffective access requests.

Another exemplary scenario illustrated by environment 300 is one in which a natural disaster, manmade emergency, or the like (e.g., a tornado 301) is associated with a geographic location and priority telecommunication services must be preserved for authorized users. In the United States, the WPS platform is accessed by pre-authorized user devices dialing a prefix before a destination number. In order for the user device to connect to the WPS platform and obtain a priority connection to the destination number, the WPS AS compares the ANI of the user device to a directory or almanac of authorized ANIs. If the user device is authorized to access the WPS platform, the user device is permitted to connect to the destination number at a higher priority. If the user device is not authorized to access the WPS platform, the SIP Invite or access request that is communicated from the user device to the IMS core will not result in an access grant.

Although locations for emergencies may not necessarily be confined to a particular location, the illustration of FIG. 3 premises that an emergency event (e.g., a tornado) 301 is located within a second cell 320. Each of a first cell 310, the second cell 320, and a third cell 330 are a few of the many cells that make up a cellular telecommunication environment 300, and each of the first, second, and third cells may be connected, via connections 342, 344, 346, to the IMS core 340. As mentioned, the hacking mitigation engine 212 of FIG. 2 may be executed on any one or more components of the IMS core 340. The IMS core may observe that the first user device 314, served by the first base station 312 in the first cell 310 has an access failure rate that exceeds a predetermined threshold (e.g., 50%) over a predetermined sampling period (e.g., 5 minutes). In response, the IMS core may instruct the P-CSCF to block subsequent SIP Invites from the first user device for a certain amount of time (e.g., 24 hours) or permanently, substantially as described with respect to the "exclude device" protocol described with respect to FIG. 2.

In another aspect, the IMS core may observe that a plurality of user devices, collectively represented in FIG. 3 by the first user device 314, have an access failure rate that exceeds a predetermined threshold. In response, the IMS core may evaluate the PANI header of the SIP Invite communicated from each user device of the set of user devices to the IMS core 340, via the first base station 312. The IMS core may examine the PANI header of the SIP Invite and, by determining the RAT and CGI of the serving cell, implement a hacking mitigation protocol that blocks subsequent SIP Invites (e.g., at the P-CSCF) from every user device having the first base station 312 or the first cell 310 identified in the PANI, substantially as described with respect to the "exclude set" protocol described with respect to FIG. 2.

In yet another aspect, the IMS core may observe that a plurality of user devices disposed in multiple cells have an access failure rate that exceeds a predetermined threshold. The plurality of user devices, collectively represented in FIG. 3 as the first and second user devices 314 and 334 are located in the first and third cells 310, 330, wherein each of the first base station 312 in the first cell 310 and the third base station 332 in the third cell 332 are connected to the IMS core 340 via connections 342, 346. In response, the IMS core may determine, or may prompt a telecommunication carrier for confirmation/approval, that a DOS threat exists. Because the location of user devices may be determined by the indication in the PANI headers that the suspect devices are being served by multiple cells that lie within a distance 304 of the first base station 312, the IMS core may implement a block of all SIP Invites having a PANI header indicating a servicing cell within a geographic boundary 302, substantially as described with respect to the "exclude in" protocol described with respect to FIG. 2.

In another example, the IMS core may observe that a plurality of user devices disposed in one or more cells have an access failure rate that exceeds a predetermined threshold or that the resources of the WPS platform on the IMS core are fully allocated to one or more user devices 324 within the second cell 320, associated with an emergency event 301. In response, the IMS core 340 may determine that access to the WPS service in the IMS core 340 should be restricted. Because the IMS core can determine the presumptive location of the emergency event 301 based on WPS access request origination location (or in response to an external input such as a news service, carrier input, etc.), the IMS core can block SIP Invites to the WPS service having a PANI that indicates the serving cell is located outside of a radius 308 of the second base station 322 or beyond some geofenced area 306 defined as an area that encompasses the emergency event 301, substantially as described with respect to the "exclude out" protocol descried with respect to FIG. 2.

Figure 4:
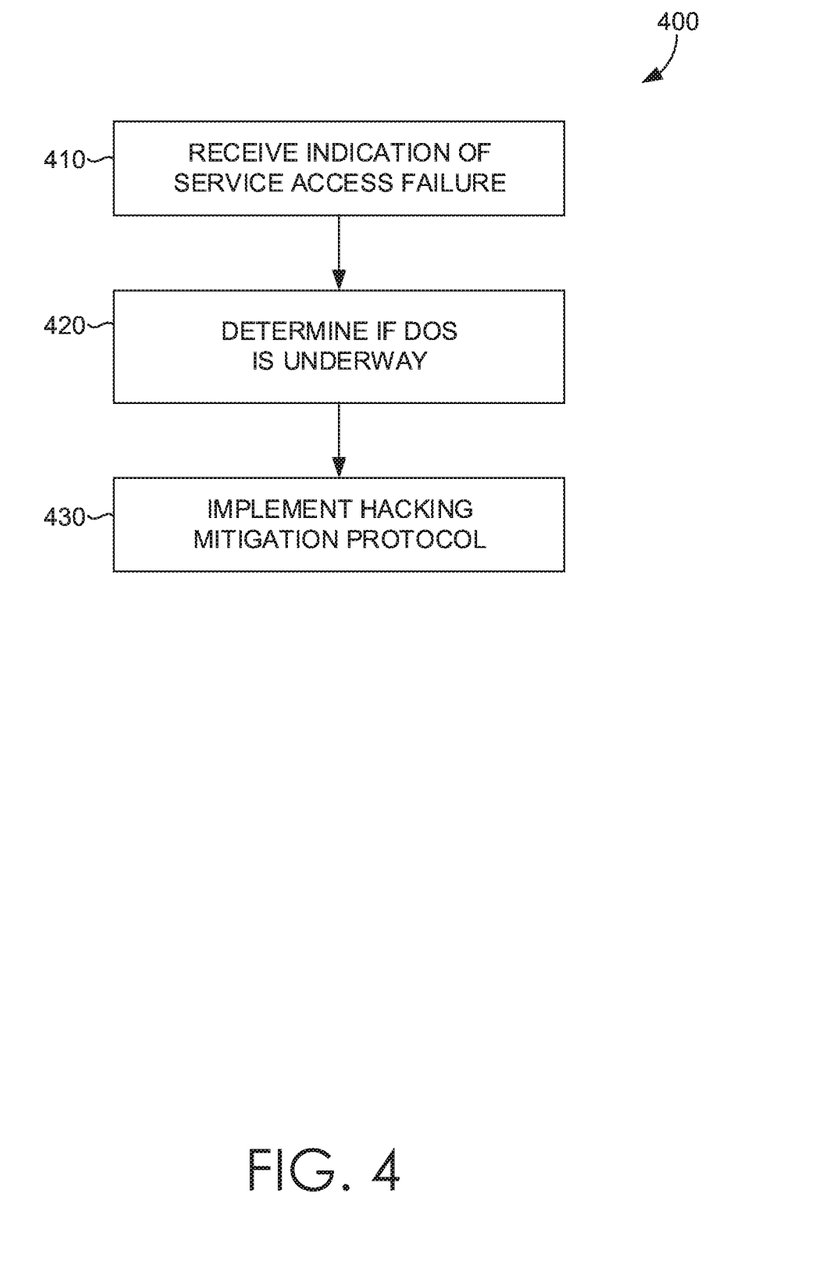
FIG. 4 is a flow diagram of one aspect of a method for mitigating authentication-based hacking of an access restricted telecommunication service, in accordance with implementations of the present disclosure.

FIG. 4 depicts a flow diagram of an exemplary method 400 for mitigating hacking of an access-restricted telecommunication service. At step 410, an indication of a service access failure is received. As discussed with respect to FIGS. 2 and 3, the service access failure indication may comprise a determination that a user device was denied access (e.g., the user device lacks authorization) to a particular service (e.g., WPS) or that an access request (e.g., a SIP Invite) does not result in a successful connection to the service. The method 400 may proceed to step 420 to determine if a service denial is occurring as a result of the service access failures detected at step 410. Substantially as described with respect to FIGS. 2 and 3, a service denial determination may be based on an access failure rate exceeded a threshold during a sampling period by a particular user device, a set of user devices, or a geographic cluster of user devices, or indications that the one or more components that connect user devices to the service exceed a predetermined threshold of utilization or congestion. At step 430, a hacking mitigation protocol is implemented against a user device, a set of user devices, or a geographic area, as described in accordance with any one or more aspects of FIGS. 2 and 3. The hacking mitigation protocol may comprise a block against attempts by any one or more user devices to access the service, wherein the block may comprise a TTL that permits the block to be lifted at the expiration of the TTL, or wherein the block may be permanent.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for mitigating impacts on services in a communications network, the system comprising:
   one or more nodes, each of the one or more nodes configured to wirelessly communicate with one or more user devices in a geographic service area; and
   one or more processors configured to perform operations comprising:

receive a plurality of access requests from a first user device of the one or more user devices to access a service on the communications network;

determine that each access request of the plurality of access requests fail to authenticate with the service; and blocking, based on a rate of access request failures of the first user device exceeding a predetermined threshold, one or more subsequent access requests from the first user device to access the service.

2. The system of claim 1, wherein the one or more protocols expire at the conclusion of a time to live (TTL) timer.

3. The system of claim 1, wherein the one or more protocols are permanent.

4. The system of claim 1, wherein the one or more processors comprise an application service and the one or more subsequent access requests are blocked by the application service.

5. The system of claim 1, wherein the one or more processors comprise a proxy call session control function (P-CSCF) and the one or more subsequent access requests are blocked by the P-CSCF.

6. The system of claim 1, wherein the service is a priority telecommunications service.

7. The system of claim 6, wherein the service is a nationwide wireless priority service.

8. The system of claim 7, wherein the one or more user devices comprise a plurality of user devices.

9. The system of claim 8, wherein the one or more processors are further configured to determine a location of each user device of the plurality of user devices and a cell identifier associated with each of the one or more nodes, the cell identifier communicated to the one or more processors in a P access network information (PANI) header.

10. The system of claim 8, wherein the location of each user device is determined based on a known location of each node of the one or more nodes, and wherein each node of the one or more nodes is connected to a common IMS core.

11. The system of claim 10, wherein each node of the one or more nodes is within a geofenced exclusion zone.

12. The system of claim 10, wherein each node of the one or more nodes is not within a geofenced inclusion zone, and wherein the one or more processors are further configured to determine that an emergency situation is within the geofenced inclusion zone.

13. The system of claim 1, wherein the one or more processors are configured to determine that a PANI header communicated from the one or more user devices and associated with the plurality of service access requests is spoofed.

14. The system of claim 1, wherein the one or more processors are further configured to prompt a service provider for approval to execute the one or more protocols.

15. A non-transitory computer readable media, having instructions stored thereon, that, when executed by one or more processors, cause the one or more processors to carry out a method for mitigating a denial of service attack on a restricted telecommunication service, the method comprising:

determining that a first user device of one or more user devices has an access failure rate greater than a predetermined threshold, wherein the access failure rate comprises a ratio of priority connection requests to priority connection successes, and wherein the priority connection requests comprise a SIP invite;

determining at least one of a unique identifier and an origination location for the first user device; and blocking, based on the access failure rate exceeding the predetermined threshold, subsequent attempts by the first user device one to access the restricted telecommunication service for a predetermined time period.

16. The computer readable media of claim 15, wherein the origination location for each user device of the one or more user devices is determined based on a P access network information (PANI) header communicated from each user device of the one or more user devices, the PANI header comprising a cell global identifier (CGI) of one or more nodes connected to each user device of the one or more user devices.

17. The computer readable media of claim 16, wherein a location associated with each node of the one or more nodes is within an access exclusion zone.

18. The computer readable media of claim 16, wherein a location associated with each node of the one or more nodes is outside of an inclusion zone.

19. The computer readable media of claim 18, wherein an emergency situation is determined to exist within a geographic area that defines the inclusion.

20. A method for mitigating hacking of a priority telecommunication service, the method comprising:

receiving a plurality of SIP invites from a user device to access a priority telecommunication service, each of the plurality of SIP invites comprising a p access network information header (PANI header), the PANI header comprising a cell global identifier associated with the cell that is connected to the user device;

determining an access failure rate of the user device exceeded a threshold during a sampling period; and blocking subsequent SIP invites from each of a plurality of user devices based on a determination that each of the subsequent SIP invites comprises the cell global identifier associated with the cell that is connected to the user device.

* * * * *